United States Patent [19]

Yamauchi

[11] Patent Number: 4,938,525
[45] Date of Patent: Jul. 3, 1990

[54] AUTOMOBILE ROOF RAIL STRUCTURE
[75] Inventor: Makoto Yamauchi, Hiroshima, Japan
[73] Assignee: Mazda Motor Corporation, Hiroshima, Japan
[21] Appl. No.: 262,874
[22] Filed: Oct. 26, 1988
[30] Foreign Application Priority Data
  Oct. 29, 1987 [JP] Japan .................. 62-274168
[51] Int. Cl.⁵ .......................................... B62D 25/02
[52] U.S. Cl. ................................ 296/185; 296/188; 296/191; 296/210
[58] Field of Search ............... 296/193, 203, 191, 209, 296/29, 30, 210, 188, 185

[56] References Cited
U.S. PATENT DOCUMENTS

| 3,724,153 | 4/1973 | Wessells, III et al. | 296/203 X |
| 3,833,254 | 9/1974 | Renner | 296/210 |
| 4,552,400 | 11/1985 | Harasaki et al. | 296/203 X |
| 4,615,558 | 10/1986 | Nakamura et al. | 296/203 |

FOREIGN PATENT DOCUMENTS

| 5522276 | 2/1953 | Japan . | |
| 146321 | 11/1979 | Japan | 296/193 |
| 124574 | 7/1985 | Japan | 296/203 |
| 2035920A | 6/1980 | United Kingdom . | |

Primary Examiner—Robert R. Song
Attorney, Agent, or Firm—Wenderoth, Lind & Ponack

[57] ABSTRACT

A side panel including automobile roof rail structure includes an inner panel formed of front and rear inner panels, an outer panel formed of front and rear outer panels, and an extended member extending rearwards from a rear end portion of the front inner panel. The extended member is provided with upper and lower flanges which are rigidly secured between the rear inner and outer panels so that two closed sections separated by the extended member are formed inside the roof rail.

5 Claims, 4 Drawing Sheets

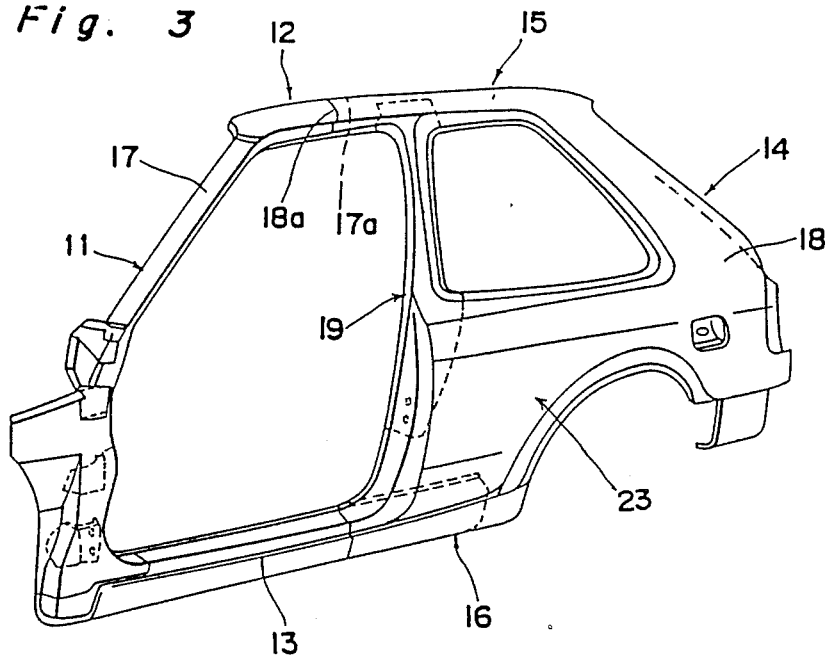
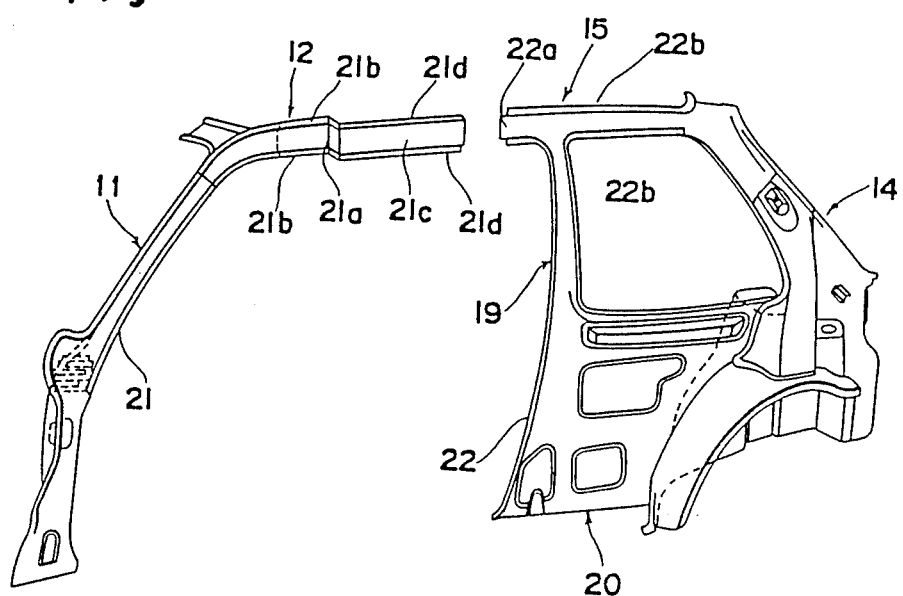

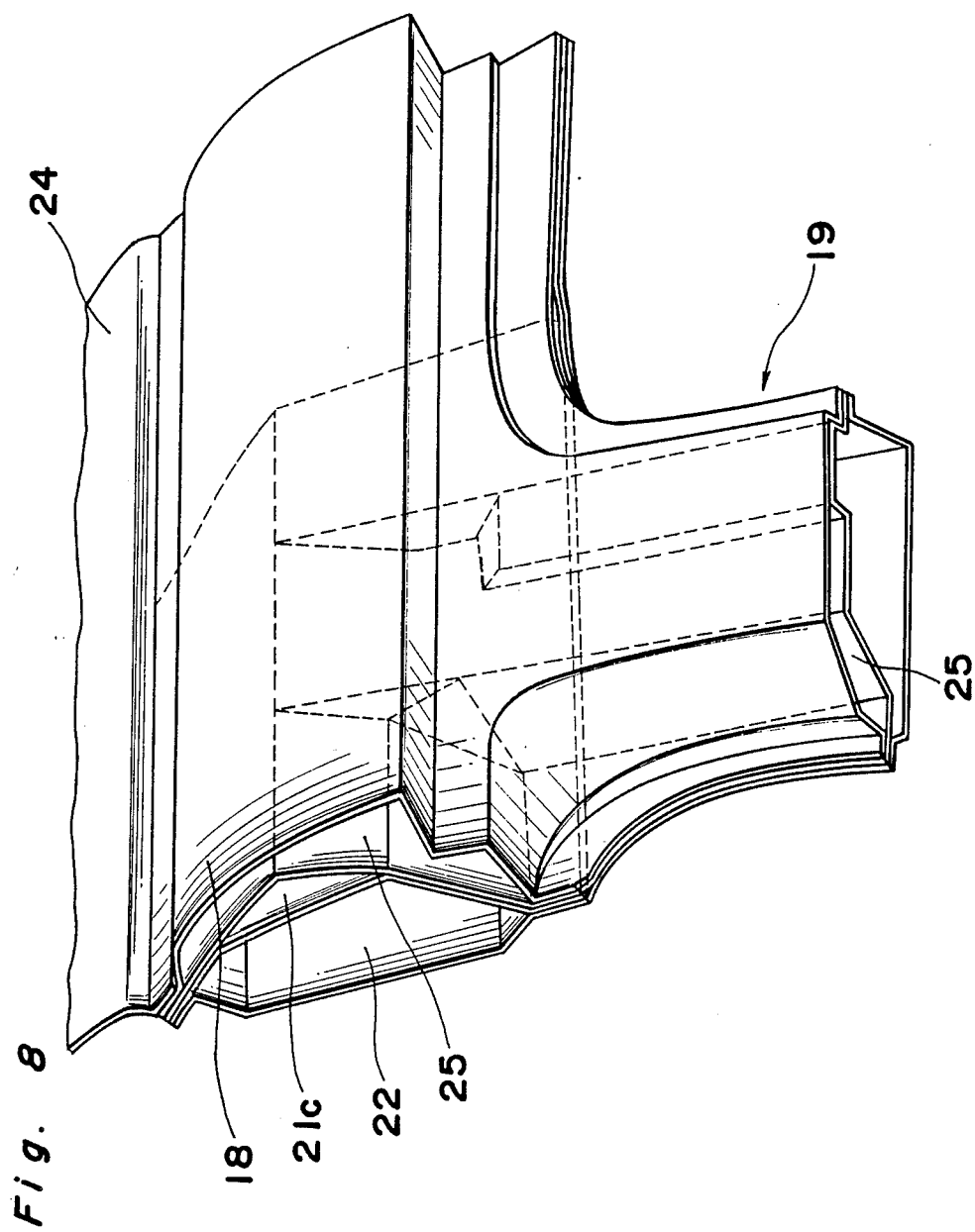

AUTOMOBILE ROOF RAIL STRUCTURE

BACKGROUND OF THE INVENTION

1. Field of the Invention

The present invention generally relates to an automobile body structure, and more particularly, to an automobile roof rail structure.

2. Description of the Prior Art

Japanese Utility Model Laid-Open Application No. 55-22276 discloses an automobile roof rail structure having a design as shown in FIG. 1. In the roof rail structure of this prior art, a closed section is formed by an outer panel 1 and an inner panel 2. Furthermore, a rear inner roof rail extends frontwards so as to be rigidly secured to a front inner roof rail at a location defined forwardly of an inner center pillar 3, with an upper end portion of the inner center pillar 3 being rigidly secured to the extended portion of the rear inner roof rail.

If the roof rail is low in strength, the problem arises that, during a collision or the like, an automobile vehicle is destroyed to such a degree that the inner space thereof may be narrowed.

Furthermore, when a seat belt anchor is mounted on the center pillar 3, the load from the seat belt is exerted on the roof rail by way of the center pillar 3, causing the roof rail to be disadvantageously deformed inwards. Accordingly, it is conceivable that a reinforcing member interposed between the outer panel 1 and the inner panel 2 would reinforce the roof rail. Such a construction, however, needs an additional member.

SUMMARY OF THE INVENTION

Accordingly, the present invention has been developed to substantially eliminate the above described disadvantage inherent in the prior art automobile roof rail structure, and has as its essential object to provide an improved automobile roof rail structure which enables a roof rail to be reinforced without any additional reinforcing member.

Another important object of the present invention is to provide an automobile roof rail structure which has a simple structure and can be readily manufactured at a low cost.

In accomplishing these and other objects, an automobile roof rail structure according to one preferred embodiment of the present invention is formed at an upper portion of a side panel and is characterized by an inner panel comprised of front and rear inner panels, an outer panel comprised of front and rear outer panels, and an extended member extending rearwards from a rear end portion of the front inner panel. The extended member is provided with upper and lower flanges which are rigidly secured between the rear inner and outer panels so that two closed sections separated by the extended member may be formed inside the roof rail.

In the automobile roof rail structure according to the present invention, the rear end portion of the front inner panel extends rearwards and the upper and lower flanges of the extended member are rigidly sandwiched between those of the rear inner panel and those of the rear outer panel.

Accordingly, two closed sections are formed in the roof rail and are separated by the extended member of the front inner panel. Although such structure is very simple, it is greatly conducive to the reinforcement of the roof rail without any additional member.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein:

FIG. 3 is a perspective view of an outer panel of the side panel of FIG. 2;

FIG. 4 is a perspective view of an inner panel of the side panel of FIG. 2;

FIG. 8 is a fragmentary perspective view of the roof rail structure according to the present invention in the vicinity of the upper end portion of a center pillar.

DETAILED DESCRIPTION OF THE PREFERRED EMBODIMENTS

Figure 1:
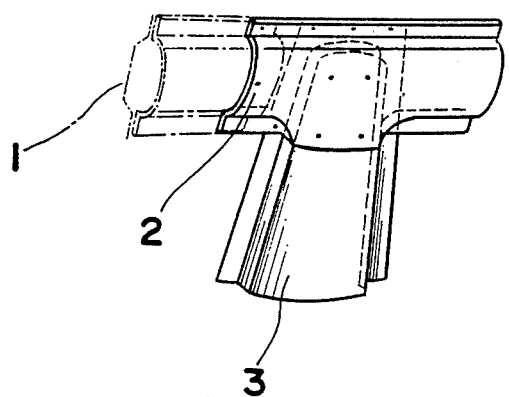
FIG. 1 is a fragmentary perspective view of a conventional automobile roof rail structure.
Figure 2:
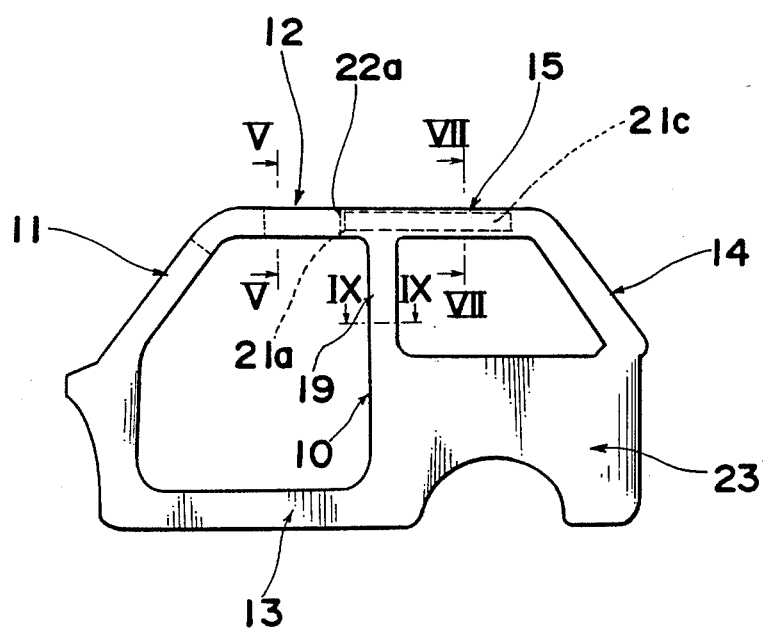
FIG. 2 is an elevational view of a side panel of an automobile body according to the present invention.

FIG. 2 depicts a side panel 10 of an automobile body structure. The side panel 10 consists of a front portion comprised of a front pillar 11 a front roof rail 12 and a side sill 13, and a rear portion comprised of a quarter pillar 14, a rear roof rail 15, a center pillar 19 and a rear fender 23. A rear portion of the front roof rail 12 is rigidly secured to a front portion of the rear roof rail 15 whereas a rear portion of the side sill 13 is rigidly secured to a front portion of the rear fender 23.

The reason for dividing the side panel 10 into the front and rear portions and joining them together is to improve the productivity in the manufacture of the side panel 10.

Accordingly, an outer panel 16 of the side panel 10 consists of a front outer panel 17 and a rear outer panel 18, as shown in FIG. 3. A rear end portion 17a of the roof rail 12 of the front outer panel 17 is joined to a front end portion 18a of the rear roof of rail 15 of the rear outer panel 18 at a location defined forwardly of the center pillar 19.

Likewise, an inner panel 20 of the side panel 10 consists of a front inner panel 21 and a rear inner panel 22, as shown in FIG. 4. A rear end portion 21a of the roof rail 12 of the front inner panel 21 is joined to a front end portion 22a of the rear roof rail 15 of the rear inner panel 22 at a location defined forwardly of the center pillar 19.

Figure 5:
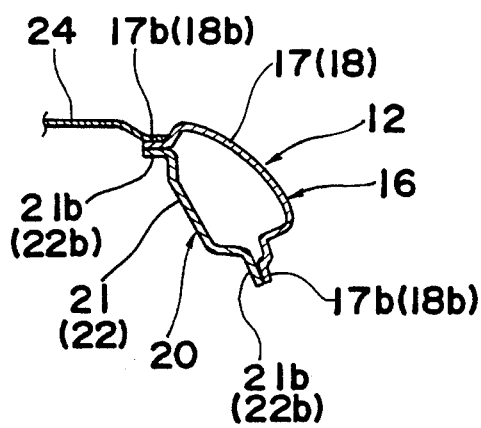
FIG. 5 is an enlarged sectional view taken along line V—V of FIG. 2.

As shown in FIG. 5, the inner and outer panels 21, 22 and 17, 18 are provided with respective upper and lower flanges 21b, 22b and 17b, 18b. The upper and lower flanges 21b and 22b of the inner panels 21 and 22 are rigidly secured to those 17b and 18b of the outer panels 17 and 18. Furthermore, a roof panel 24 is rigidly secured to the upper flanges 17b and 18b of the outer panels 17 and 18.

Figure 6:
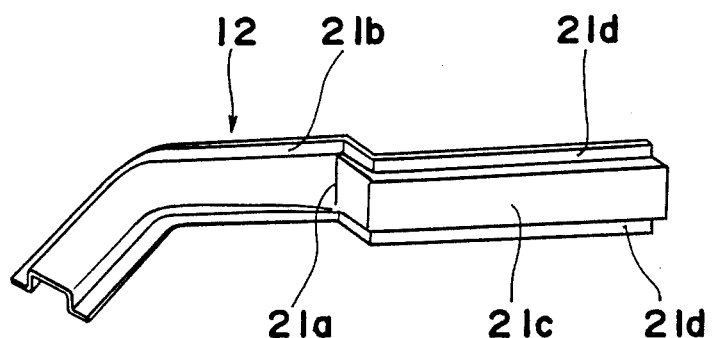
FIG. 6 is a perspective view of a front inner roof rail according to the present invention having an extended portion at its rear portion.

FIG. 6 depicts the roof rail 12 of the front inner panel 21, which is provided at its rear end 21a with an extended member 21c integrally formed therewith. The extended portion 21c is bent outwards and extends rearwardly of the center pillar 19.

Figure 7:
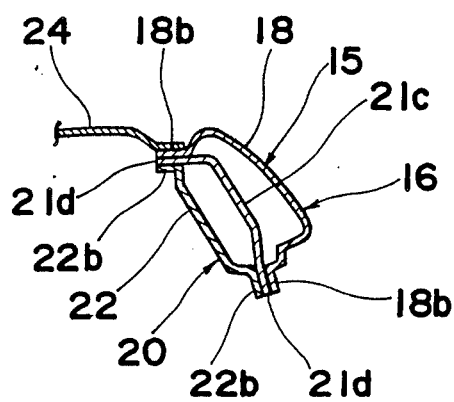
FIG. 7 is an enlarged sectional view taken along line VII—VII of FIG. 2.

As shown in FIG. 7, the rear inner and outer panels 22 and 18 and the extended member 21c of the front inner panel 21 are joined together in a manner in which upper and lower flanges 21d of the extended portion 21c are securely sandwiched between those 22b of the rear inner panel 22 and those 18b of the rear outer panel 18.

FIG. 8 depicts the roof rail structure in the vicinity of the upper end portion of the center pillar 19. A reinforcing member 25 for contributing to the strength of the center pillar 19 is interposed between the rear inner and outer panels 22 and 18 in a manner in which the reinforcing member 25 inside the roof rail is rigidly secured between the rear outer panel 18 and the upper and lower flanges 21d of the extended member 21c of the front inner panel 21 whereas the reinforcing member 25 inside the center pillar 19 is rigidly secured between flanges of the inner and outer panels of the center pillar 19.

Figure 9:
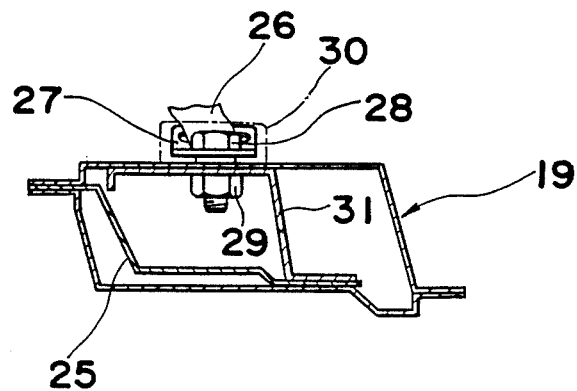
FIG. 9 is an enlarged sectional view taken along line IX—IX of FIG. 2.

FIG. 9 depicts the arrangement of a portion of the center pillar 19 on which a seat belt anchor is fixedly mounted. The seat belt anchor is comprised of an anchor bolt 28, an anchor nut 29, an anchor nut plate 31 and the like. An end portion of a seat belt 26 which extends inside the automobile body is guided by a belt guide 27 and is fastened to the side of the inner panel of the center pillar 19 by the anchor bolt 28 and nut 29, with the anchor nut plate 31 being interposed between the innerpanel of the center pillar 19 and the anchor nut 29. The anchor nut plate 31 is rigidly secured to the outer panel of the center pillar 19 through the reinforcing member 25. The end portion of the seat belt 26 is protected by a cover 30.

As described above, the extended member 21c of the front inner panel 21 which extends across the center pillar and acts as a reinforcing member is interposed between the rear inner and outer panels 22 and 18 inside the roof rails 12 and 15. Accordingly, two closed sections are formed between the extended member 21c and the rear inner panel 22 and between the extended member 21c and the rear outer panel 18, to thereby reinforce the roof rails 12 and 15 without any additional reinforcing member.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A side panel of an automobile that includes automobile roof rail structure, said side panel comprising:
    an inner panel including a front inner panel having a front roof rail, and a rear inner panel having a rear roof rail and integral with said front inner panel, each of said roof rails having respective upper and lower flanges, and the roof rail of said front inner panel having an extended member integral therewith and extending rearwardly therefrom in the side panel, said extended member having upper and lower flanges; and
    an outer panel joined to said inner panel, said outer panel including a front outer panel and a rear outer panel integral therewith, said integral front and rear outer panels defining a roof rail having upper and lower flanges,
    said extended member interposed between and reinforcing the roof rail of said rear inner panel and the roof rail of said outer panel, the upper flange of said extended member sandwiched between and fixedly secured to the upper flange of the roof rail of said rear inner panel and the upper flange of the roof rail of said outer panel, the lower flange of said extended member sandwiched between and fixedly secured to the lower flange of the roof rail of said rear inner panel and the lower flange of the roof rail of said outer panel,
    two sections having closed cross-sectional shapes being defined by the roof rail of said rear inner panel, the roof rail of said outer panel and said extended member interposed therebetween.

2. A side panel as claimed in claim 1, and further comprising a central pillar extending substantially vertically at a front portion of the side panel, and wherein said extended member extends rearwardly of said central pillar in the side panel.

3. A side panel as claimed in claim 2, wherein the roof rail structure includes a roof panel fixedly secured at a side thereof to the upper flange of the roof rail of said outer panel.

4. A side panel as claimed in claim 2, and further comprising a reinforcing member extending along and reinforcing said central pillar, said reinforcing member fixedly secured to said extended member.

5. A side panel as claimed in claim 4, and further comprising a seat belt anchor rigidly mounted on said reinforcing member.

* * * * *